Jan. 10, 1967 E. GAEUMANN ETAL 3,297,526
PROCESS FOR PRODUCING COPROGEN AND DESFERRICOPROGEN
Filed April 2, 1963 2 Sheets-Sheet 1

ERNST GAEUMANN
and
ERNST VISCHER
INVENTORS.
BY

United States Patent Office 3,297,526
Patented Jan. 10, 1967

3,297,526
PROCESS FOR PRODUCING COPROGEN AND DESFERRICOPROGEN
Ernst Gaeumann, Zurich, and Ernst Vischer, Basel, Switzerland, assignors to Ciba Corporation, New York, N.Y., a corporation of Delaware
Filed Apr. 2, 1963, Ser. No. 270,031
Claims priority, application Switzerland, Apr. 5, 1962, 4,188/62; Nov. 19, 1962, 13,537/62
8 Claims. (Cl. 167—65)

The present invention relates to a new process for the manufacture of the iron-containing, growth-promoting substance, coprogen, and the corresponding iron-free compound, desferricoprogen, their derivatives and salts.

The growth-promoting substance, coprogen, was first isolated by Hesseltine et al. from a strain of the genus Penicillium. Its structure is still unknown.

The reddish brown, amorphous compound has the elementary constitution:

C=50.18%, H=6.72%, N=9.36%, Fe=6.64%, and O=27.10% (calculated).

The ultraviolet spectrum in ethanol shows maxima at 213 m$\mu$ (log $E_1^{\%}cm.$ = 2.72)

254 m$\mu$ (log E=2.34) and 450 m$\mu$ (log $E_1^{\%}cm.$ = 1.56)

In aqueous solution the spectrum is not changed significantly.

Figure 1:
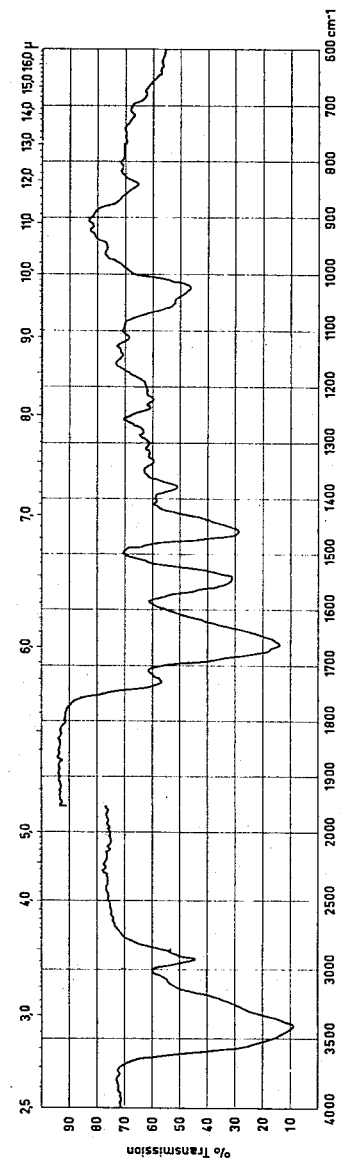

The infrared spectrum in potassium bromide displays, inter alia, bands at 3415, 2922, 1730, 1724, 1660, 1539, 1457, 1377, 1330, 1279, 1236, 1223, 1143, 1110, 1023, 945, 922, 839 cm.$^{-1}$, cf. FIG. 1.

The paper-chromatographic behaviour of coprogen in comparison with that of the other fungoid sideramines is put together in the table below:

TABLE

| Sideramine | Rf (I) | Rf (II) |
|---|---|---|
| Ferrichrome | 0.28 | 0.30 |
| Ferrichrysine | 0.26 | 0.34 |
| Ferricrocine | 0.29 | 0.28 |
| Ferrirhodine | 0.43 | 0.88 |
| Coprogen | 0.43 | 0.55 |
| Ferrirubin | 0.42 | 0.73 |

System I: n-butanol—glacial acetic acid—water 4:1:1.
System II: tertiary butanol—water—saturated sodium chloride solution—0.1 N-hydrochloric acid 50:25:25:1.
Paper impregnated with acetone—water—saturated sodium chloride solution 6:3:1 (v./v./g.) and dried in the air for 15 minutes.

Figure 2:
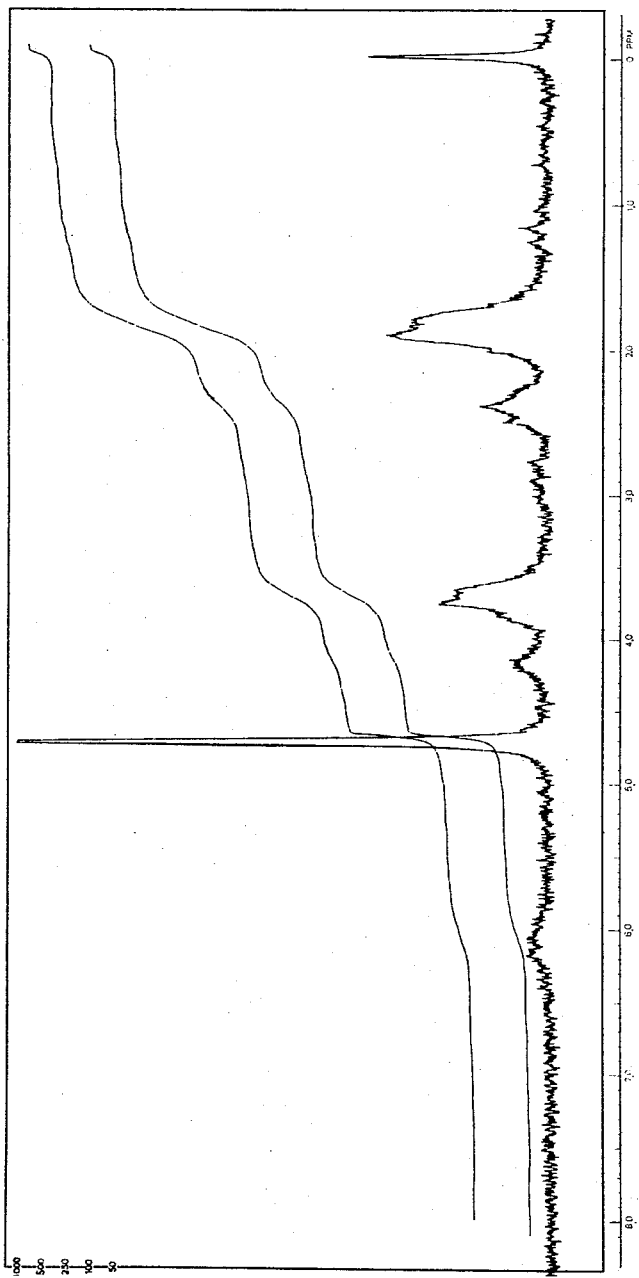

In the treatment of coprogen with bases or acids or substances forming iron-complexes the iron is removed from the molecule, and the desferri-coprogen is obtained as a light brown powder. The NMR spectrum of the compound is shown in FIG. 2.

From desferricoprogen coprogen is recovered by the addition of ferric chloride at a neutral pH value.

It has been found that coprogen and desferricoprogen are produced from other strains of the genus Penicillium, viz. from *Penicillium citrinum* M 3614, *Penicillium camemberti* M98, *Penicillium urticae* 4277, *Penicillium notatum* 1613 and *Penicillium chrysogenum* 4360. These strains are kept in the Federal Institute of Technology, Institute for special botany, Zurich, and in our laboratories under the above designation. The strains form an abundant, septated and branched substrate mycelium from which the conidiophores emanate as side branches. The conidial structure is in the form of a typical penicillus. It is for this reason that the strains are recognized as members of the genus Penicillium Link 1809 (Link, H.F., Obs. ord. plant. nat. in Ges. natur. Freunde Berlin 3 [1809]).

Within the genus Penicillium a determination of the type can best be effected by means of the classification scheme of Raper and Thom (Raper, K.B., and Ch. Thom, A Manual of the Penicillis, The Williams & Wilkins Co., Baltimore, 1949).

*Penicillium citrinum* M 3614 was isolated in 1957 from irrigated sewage soil in Munster, Westphalia. It belongs to the section Asymmetrica, sub-section Velutina, *P. citrinum* series. A further distinction is made by Raper and Thom, l.c., p. 338 et seq., according to the quantitative branching of the metulae. Strain M 3614 has on an average 3 branchings of the metulae.

*Penicillium camemberti* M 98 was obtained in 1953 by the Centraalbureau voor Schimmelcultures, Baarn (CBS) as *P. camemberti* Thom 1906. According to Raper and Thom, l.c., p. 427, it is identical with the type strain *P. camemberti* NRRL 877.

*Penicillium urticae* 4277 was obtained in 1945 by CBS under the designation *Penicillium urticae* Bainier 1906. It belongs to the section Asymmetrica, sub-section Fasciculata, *P. urticae* series. According to Raper and Thom it is identical with the strain NRRL 992 with which the description of *Purticae* given by Raper and Thom, i.c., p. 536 et seq., tallies.

*Penicillium notatum* 1613 was obtained in 1945 as *Penicillium notatum* Westling 1911, strain ATCC 9171. It belongs to the section Asymmetrica, sub-section Velutina, *P. chrysogenum* series. It corresponds to the description of *P. notatum* given by Raper and Thom, l.c., p. 367 et seq.

*Penicillium chrysogenum* 4360 is identical with *Penicillium chrysogenum* Thom 1910, strain ATCC 10003 or NRLL 2000. It belongs to the section Asymmetrica, sub-section Velutina, *P. chrysogenum* series. It is described by Raper and Thom, l.c., p. 359 et seq.

The new process is characterized by growing the strains *Penicillium citrinum* M 3614, *Penicillium camemberti* M 98, *Penicillium urticae* 4277, *Penicillium notatum* 1613 and/or *Penicillium chrysogenum* 4360 under aerobic conditions in an aqueous nutrient solution containing a carbon source and a nitrogen source and inorganic salts, and isolating coprogen and/or desferricoprogen from the culture filtrate, and, if desired, converting coprogen into the iron-free compound and/or preparing derivatives or salts of these compounds.

The formation of coprogen and/or desferricoprogen is favoured by a nutrient medium poor in iron, and it is therefore advantageous to carry out the cultivation with a lack of iron, preferably with an iron content of at most 10$^{-7}$ mols/liter.

The carbon and nitrogen sources used in the growing of the strains are: carbohydrates, for example, glucose, saccharose, lactose, starches, alcohols, such as mannitol and glycerine, amino acids, for example, ornithine, peptides, proteins and their decomposition products, such as peptone or tryptone, meat extracts, water-soluble components of grain, such as maize or wheat, distillation radicals from the manufacture of alcohols, yeast, seeds, especially those of the rape plant, soya plant and cotton plant, ammonium salts, nitrates. The inorganic salts that the culture solution may contain are chlorides, carbonates, sulfates, nitrates of alkalis, alkaline earths, magnesium, zinc and manganese, and traces of iron.

Growth is aerobic, for example, in quiescent surface cultivation or advantageously submerged while shaking or stirring in shaking bottles in the presence of air or oxygen or the known fermenters. Suitable temperatures are those between 18 and 40° C., advantageously 27° C. The culture solution generally exhibits a considerable growth-promoting action after 6 to 12 days.

The coprogen activity can be determined by the modified Bonifas test (cf. Zaehner and co-workers, Arch. Mikrobiol. 36, 325 et seq. [1960]). The test solution was a ferrimycine solution with a content of 0.01 mg./ml., and the test strain was *Staphylococcus aureus*.

The coprogen concentration of the culture solution can also be determined optically. For this purpose, 5 ml. of the culture liquid is shaken for 5 minutes with 1.5 g. of sodium chloride, 1 ml. of ferricsulfate solution of 0.1% strength and 5 ml. of benzyl alcohol, centrifuged, the organic phase is filtered and the extinction of the organic phase at 410 m$\mu$ is determined. An extract prepared in the same manner from noninoculated culture solution serves as control sample.

When growth is complete, 1 gram of ferrichloride can be added per liter to the culture solution, whereby the desferricoprogen present is converted into coprogen. The iron can also be added at any time during the fermentation or in portions. The mycelium is separated from the culture filtrate, advantageously in the presence of a filtering assistant, for example, Hyflo Super-Cel, after which the main quantity of coprogen is found in the culture filtrate. A considerable proportion nevertheless remains attached to the mycelium. It is therefore advantageous to wash it out well. Water or aqueous alcohol, for example, aqueous methanol, can be used for this purpose.

The coprogen can also be isolated from the culture filtrate by methods in themselves known, and one of the following procedures or combinations of procedures can be adopted:

(1) Adsorption agents can be used, for example, activated carbons, such as Norit, activated earths, such as Frankonit, fuller's earth or Floridin, or resin adsorbers, such as Asmit. Elution of the adsorbate is advantageously carried out with mixtures of water and organic solvents miscible with water, for example with water-methanol, water-pyridine, dilute acetic acid-methanol or water-methanol-glacial acetic acid-butanol mixtures. A mixture of water (4 parts by volume) and pyridine (1 part by volume) has proved to be specially suitable for the elution of a Frankonit or Norit adsorbate.

(2) The coprogen can also be extracted from an aqueous solution by means of organic solvents. Higher organic alcohols, for example, benzyl alcohol or isopropyl alcohol, have proved specially suitable for this purpose. It is of advantage to add an inorganic salt, for example, ammonium sulfate or sodium chloride, to the aqueous phase. From the organic extracts obtained the coprogen can be recovered in concentrated form either by evaporating the solvent or by precipitation by means of a suitable organic solvent, for example, ether, petroleum ether or ethyl acetate.

(3) A further method of concentrating the coprogen consists in distributing it between an aqueous solution and a solution of phenol in chloroform, whereby the phenol content of the chloroform solution may be varied.

(4) Another method of concentrating and/or separating the coprogen is by the use of chromatography, such as adsorption chromatography on different materials, for example, Norit, aluminum oxide, magnesium silicates, silica gel, calcium sulfate, and partition chromatography using cellulose, starch, silica gel, Celite, and the like, as supporting media, and by chromatography on ion-exchange resins, for example, on Dowex 50, Amberlite IRC 50, and the like.

(5) Furthermore, the coprogen can be concentrated by counter-current distribution (Craig) between two immiscible solvent phases. The following solvent system has proved specially suitable for this purpose: n-butanol-benzyl-alcohol–0.001-N-hydrochloric acid–a saturated (at 19° C.) aqueous solution of sodium chloride (9:9:15:5).

Desferri-coprogen is formed along with coprogen, and can be directly isolated from the culture filtrate, if no iron salts are added after termination of the fermentation. In isolating desferricoprogen it is of advantage to remove any iron present in the culture filtrate, for example, by the addition of substances forming iron complexes, for example, 8-hydroxy-quinoline.

The substances forming iron complexes can be added directly to the culture solution after completion of the fermentation. It is of advantage to make the addition at a later stage of working up in order to remove any iron (III) ions that may have been introduced by the agents used.

The isolation of the desferri-coprogen from the culture solution is carried out by the methods used for isolation of the coprogen described above.

As already mentioned, coprogen is known as growth-promoting factor and can be used as such. Desferri-coprogen possesses valuable pharmacological properties and can be used as medicament. It is capable of excreting iron from the organism by binding it in the form of the iron complex, coprogen. Thus, in the case of deposition of ferriferous pigments in the organism it brings about excretion of iron, for example in haemochromatosis and haemosiderosis and in cirrhosis of the liver.

The pharmaceutical preparations contain desferri-coprogen in admixture with an organic or inorganic pharmaceutical excipient suitable for enteral or parenteral administration.

They are prepared from the starting materials by conventional methods. Suitable excipients are substances that do not react with desferricoprogen, such, for example, as gelatine, lactose, glucose, sodium chloride, starches, magnesium stearate, talc, vegetable oils, benzyl alcohols, gums, polyalkylene glycols, cholesterol and other known medicinal excipients.

The invention is illustrated in the following examples.

*Example 1*

The strain *Penicillium citrinum* M 3614 is grown in a well aerated submerged culture at 27° C. The culture solution contains, per liter of tap water, 20 g. of glucose, 5 g. of L-asparagine, 1 g. of secondary potassium phosphate, 1 g. of crystalline magnesium sulfate ($MgSO_4$, $7H_2O$) and 0.5 g. of calcium chloride. The proportion of iron in the tap water is 20 to 30$\gamma$/liter. The culture solution is sterilized for 20 minutes at 120° C. It is inoculated with a spore suspension that contains 150 to 180 million spores per liter.

After 6 to 10 days, 1 g. of ferric chloride per liter is added to the cultures, and the cultures filtered in the presence of 2% of Hyflo Super-Cel. To the culture filtrate is then added, per liter, 10 g. of sodium chloride, and it is then extracted with ⅛ volume of chloroform-phenol (1 part by volume:1 part by weight). The organic phases are combined, and filtered through Celite. 4 volumes of ether are then added, and extraction is carried out 4 to 5 times with distilled water (until the organic phase is completely colorless). The aqueous extracts are freed from residual phenol with ether and then lyophilized. 2.48 g. of crude lyophilisate are obtained from 10 liters of culture.

2.48 g. of crude extract are subjected to Craig partition over 50 steps. The partition system used is a mixture of 1.8 liters of n-butanol, 1.8 liters of benzyl-alcohol, 3 liters of 0.001 N hydrochloric acid and 1 liter of a saturated aqueous sodium chloride solution. A dark brown compound collects in the fractions 2 to 8, and a reddish brown substance in the fractions 25 to 38. ($K=1.32$).

The fractions 25 to 38 are combined, the same volume of ether is added to them, the aqueous phase is isolated, and the ether layer is again extracted three times with water. The dyestuff goes completely into the aqueous phase. To this phase is added 10% of sodium chloride, and it is extracted several times with phenol-chloroform (1 kg. per liter) by shaking. The deep brownish red and turbid extracts are cleared with Celite, to them is added twice their volume of ether, and the sideramine is again taken up in water. The aqueous extracts that have been washed with ether are evaporated in vacuo. 600 mg. of a somewhat greasy brownish red residue remains. For further purification, a second Craig partition is carried out in the same solvent system over 160 steps. The coprogen is obtained from the fractions 100 to 119 in the manner described above. By reprecipitation from methanol-ether there are obtained 400 g. of a fine reddish brown amorphous powder that is homogeneous on a paper chromatogram.

From the fractions 2 to 8 or the first partition there are isolated in the same manner 355 mg. of subsidiary components in the form of a brownish black amorphous powder, the said components being only very slightly active. According to paper chromatography, the powder is not homogeneous.

The coprogen of the fractions 100 to 119 shows the following properties:

Elementary analysis: C=50.18%, H=6.72%, N=9.36%, Fe=6.64%, O (calculated)=27.10%.

Absorption spectrum in ultra-violet and visible range in rectified alcohol:

| $\lambda$, m$\mu$ | 213 | 254 | 450 |
|---|---|---|---|
| log E 1% 1 cm. | 2.72 m | 2.34 i | 1.50 m |

The infra-red spectrum shows, inter alia, bands at 3415, 2922, 1730, 1724, 1660, 1539, 1457, 1377, 1330, 1279, 1236, 1223, 1143, 1110, 1023, 945, 922, 839 cm.$^{-1}$, cf. FIG. 1.

The paper chromatographic behaviour of coprogen as compared with that of the other fungoid sideramines is shown in the following table:

| Sideramine | Rf (system I) | Rf (system II) |
|---|---|---|
| Ferrichrome | 0.28 | 0.30 |
| Ferrichrysine | 0.26 | 0.34 |
| Ferricrocine | 0.29 | 0.28 |
| Ferrirhodin | 0.43 | 0.88 |
| Coprogen | 0.43 | 0.55 |
| Ferrirubin | 0.42 | 0.73 |

System I: n-butanol—glacial acetic acid—water 4:1:1.
System II: tertiary-butanol—water—saturated sodium chloride solution—0.1 N-hydrochloric acid—50:25:25:1.
Paper impregnated with acetone-water-saturated sodium chloride solution 6:3:1 (v./v./g.) and dried in the air for 15 minutes.

The same product is obtained by growing the strain *Penicillium camemberti* M 98, *Penicillium urticae* 4277, *Penicillium notatum* 1613 or *Penicillium chrysogenum* 4360 and working up the culture filtrate as described.

*Example 2*

69 mg. of coprogen are dissolved in 5 ml. of water and, to this solution are added 100 mg. of 8-hydroxy-quinoline in approximately 1 ml. of methanol. The mixture so obtained is allowed to stand at room temperature for 16 hours while continually stirring. The clear, light brown solution obtained by filtering to remove the black sediment (hydroxy-quinoline-iron complex) with the aid of Celite, is extracted with chloroform several times by shaking in order to remove the excess reagent. The aqueous solution is evaporated under reduced pressure and the residue is reprecipitated from methanol with a large quantity of ether. The reaction product precipitates as a light brown powder. The NMR spectrum of this compound is shown in FIG. 2.

*Example 3*

5 mg. of coprogen which is free from iron are heated for 5 hours at 110° C. with 1 ml. of water and 1 ml. of concentrated hydrochloric acid, and the hydrolysis mixture is then evaporated to dryness in vacuo. The residue is dissolved in 5 ml. of rectified alcohol, and the solution so obtained is stirred magnetically in the presence of 10 mg. of platinum oxide in a hydrogen atmosphere in order to reduce the hydroxyl-amino groups to amino groups. The reaction mixture is then separated from the catalyst by filtration, and the filtrate is then evaporated. Paper-chromatographic investigation of the residue using phenol-water (8:2) as solvent system and staining with ninhydrin shows the presence of ornithine as the sole ninhydrin-positive cleavage product.

What is claimed is:

1. A process for the manufacture of a member selected from the group consisting of coprogen and desferricoprogen, wherein a member selected from the group consisting of *Penicillium citrinum* M 3614, *Penicillium camemberti* M 98, *Penicillium urticae* 4277, *Penicillium notatum* 1613 and *Penicillium chrysogenum* 4360 is grown under aerobic conditions in an aqueous nutrient solution containing a carbon source and a nitrogen source and inorganic salts, and a member selected from the group consisting of coprogen and desferricoprogen is isolated from the culture filtrate.

2. A process as claimed in claim 1, wherein the resulting coprogen is converted into desferricoprogen by treating it with 8-hydroxy-quinoline.

3. A process as claimed in claim 1, wherein the culture medium contains iron in an amount of at most $10^{-7}$ mols/liter.

4. A process as claimed in claim 1, wherein iron salts are added to the culture solution to convert desferricoprogen to coprogen.

5. A process as claimed in claim 1, wherein the coprogen and desferricoprogen are extracted by means of phenol-chloroform.

6. A process as claimed in claim 1, wherein the crude coprogen and desferricoprogen are purified by means of countercurrent distribution in the system benzyl alcohol+n-butanol+saturated aqueous sodium chloride solution+0.001 N-hydrochloric acid (9:9:5:15).

7. A process as claimed in claim 1, wherein 8-hydroxy-quinoline is added to the culture filtrate for the purpose of obtaining desferricoprogen.

8. Desferricoprogen.

No references cited.

JULIAN S. LEVITT, *Primary Examiner.*

S. ROSEN, *Assistant Examiner.*